United States Patent
DeFlumere et al.

(10) Patent No.: US 8,218,012 B2
(45) Date of Patent: Jul. 10, 2012

(54) MULTI-WINDOW/MULTI-TARGET TRACKING (MW/MT TRACKING) METHOD AND SYSTEM FOR POINT SOURCE OBJECTS

(75) Inventors: Michael E DeFlumere, Winchester, MA (US); William E Shaw, Marlborough, MA (US); Walter P Watson, Lowell, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1149 days.

(21) Appl. No.: 12/050,344

(22) Filed: Mar. 18, 2008

(65) Prior Publication Data

US 2009/0237511 A1 Sep. 24, 2009

(51) Int. Cl.
*H04N 5/33* (2006.01)
*G06K 9/00* (2006.01)

(52) U.S. Cl. ......... 348/164; 348/166; 348/169; 382/103

(58) Field of Classification Search .............. 348/143, 348/164, 166, 169; 382/103; 250/208.1–208.2, 250/332
See application file for complete search history.

(56) References Cited

U.S. PATENT DOCUMENTS

| | | | |
|---|---|---|---|
| 5,317,395 A * | 5/1994 | Carr et al. | 348/164 |
| 6,075,235 A * | 6/2000 | Chun | 250/208.1 |
| 6,529,614 B1 * | 3/2003 | Chao et al. | 382/103 |
| 6,741,341 B2 | 5/2004 | DeFlumere | |
| 6,836,320 B2 | 12/2004 | Deflumere et al. | |
| 6,864,965 B2 | 3/2005 | DeFlumere | |
| 6,877,691 B2 | 4/2005 | DeFlumere et al. | |
| 7,248,751 B2 * | 7/2007 | Schuler et al. | 382/284 |
| 7,616,231 B2 * | 11/2009 | Farrier | 348/208.99 |
| 7,940,961 B2 * | 5/2011 | Allen | 348/169 |
| 2007/0007436 A1 * | 1/2007 | Maksymowicz | 250/208.2 |

* cited by examiner

*Primary Examiner* — Bharat N Barot
(74) *Attorney, Agent, or Firm* — Maine Cernota & Rardin; David A. Rardin

(57) ABSTRACT

A sensor is used to detect and track a plurality of objects by using a separate track window for each object. Such sensors may be electro optical or infrared. Each object of interest (potential target) in the sensor FOV has a unique track window assigned. This allows independent control of video frame summing for each object to maintain a constant (optimized) signal to noise ratio (SNR) over an extremely large signal dynamic range and reduces track jitter by the simultaneous tracking of multiple objects.

20 Claims, 3 Drawing Sheets

MULTI-WINDOW/MULTI-TARGET TRACKING (MW/MT TRACKING) METHOD AND SYSTEM FOR POINT SOURCE OBJECTS

STATEMENT OF GOVERNMENT INTEREST

Portions of the present invention may have been made in conjunction with Government funding under contract number W9113M-05-C-0115, and there may be certain rights to the Government.

FIELD OF THE INVENTION

The invention relates to detection and tracking of objects, and more particularly, to multi-window/multi-target (MW/MT) tracking for point source objects.

BACKGROUND OF THE INVENTION

Current infrared (IR) seekers are limited to simultaneous detection of dim targets and tracking bright targets. Global gain/integration time is used for these sensors. Existing systems compromise performance since they adjust the gain and/or integration time in response to the bright objects in the field of view (FOV) to the detriment of the dim objects.

What is needed, therefore, are techniques for detection and tracking of multiple objects that have a wide range in signal to noise level.

SUMMARY OF THE INVENTION

A sensor is used to detect and track a plurality of objects by using a separate track window for each object. Such sensors operate in electro optical (EO) to IR bands, for example. Advantages are that each object of interest (potential target) in the sensor FOV has a unique track window assigned. This allows independent control of video frame summing for each object to maintain a constant (optimized) signal to noise ratio (SNR) over an extremely large signal dynamic range. It also discriminates between closely spaced objects (CSOs). Another advantage of this approach is a reduction of track jitter by the simultaneous tracking of multiple objects.

One embodiment of the present invention provides a method for multi-window/multi-target (MW/MT) tracking for point source objects comprising the steps of detecting at least one object with a focal plane array and outputting a sequence of frames, wherein the sequence of frames are corrected and registered, and successive frames are transformed to a new position to offset platform motion from a previous frame as detected by an inertial measurement unit; assigning a unique local frame sum to each object, providing one track window per object; applying detection algorithms to each object; and producing track files of at least one object. In an embodiment, the local frame sum is independently controlled for each object. In another embodiment, track jitter is reduced by simultaneous tracking of multiple objects by extracting common noise features that are inertial measurement unit (IMU) and platform based. For other embodiments, at least one object comprises an unresolved, sub-pixel, extent.

In embodiments, target signatures comprise objects defined by a very low signal to noise ratio (SNR). In other embodiments, detecting objects comprises at least one detection band within visible to very long infrared wavelengths and the detection algorithms comprise Multiple Hypothesis Tracking and Probabilistic Data Association detection algorithms. In further embodiments, the number of local frame sums is determined based on the brightness of the object. In other embodiments, multiple track windows operate in parallel on one set of input data and spatially overlap. In another embodiment, the presence of Closely Spaced Objects (CSOs) is determined by correlation techniques between overlapping track windows.

One embodiment provides a sensor video system to detect and track a plurality of objects. It comprises a focal plane array (FPA) generating N-channel sampled video; front end electronics receiving the N-channel sampled video, then generating M-channel serial data; and an integrated seeker electronics assembly (iSEA) receiving the M-channel serial data, wherein a unique local frame sum is assigned to each object, providing one track window per detected object. Another embodiment further comprises an active band sensor. In yet another embodiment, the focal plane array (FPA) comprises at least one infrared detector and at least one read out integrated circuit (ROIC).

In other embodiments, at least one infrared detector performs opto-electronic conversion and at least one read out integrated circuit (ROIC) comprises integration time control and signal skimming and offset control. For yet other embodiments, the front end electronics comprise offset control and analog to digital conversion. In another embodiment, the integrated seeker electronics assembly (iSEA) comprises digital signal processing and digital image processing. Further embodiments include digital signal processing that comprises non-uniformity correction and pixel displacement mapping.

A further embodiment is a multi-window/multi-target (MW/MT) tracking sensor system to detect and track a plurality of objects comprising a focal plane array (FPA) generating N-channel sampled video; front end electronics receiving the N-channel sampled video, generating M-channel serial data; an integrated seeker electronics assembly (iSEA) receiving the M-channel serial data, wherein a unique local frame sum is assigned to each object, providing one track window per detected object; and an active band sensor providing detection and ranging information fused with the M-channel serial data, producing track files of the objects.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The apparatus described below is used to detect and track multiple, unresolved (significantly sub-pixel), dim (very low signal to noise ratio (SNR)), objects. The detection band(s)

can be from the visible to the very long IR. In general, any band(s) for which high quality detector arrays are available is suitable.

Figure 1:
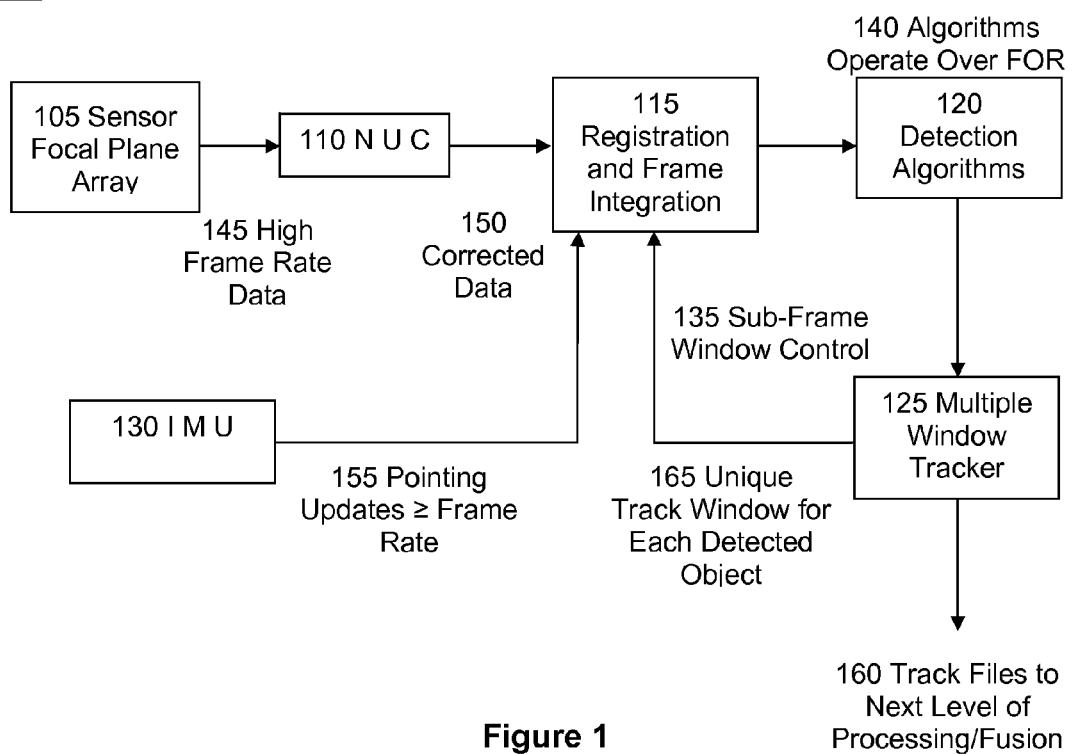
FIG. 1 is a block diagram illustrating a multiple window tracking system configured in accordance with one embodiment of the present invention.

FIG. 1 shows a block diagram of the operation of an embodiment of a multiple window tracker 100. A large (typically a million or more pixel) focal plane array (FPA) 105 outputs a sequence of frames 145 that represent the detected signal from each pixel for the set integration time. In the MW/MT Tracking approach, the FPA is designed and configured to operate at a high (several kHz) frame rate 145. This, in general, may be influenced by the size of the array and the number of output channels that can be practically implemented.

The next step in the processing chain is the correction of data using Non-uniformity Correction (NUC) algorithms 110. This compensates for variations in response over the FOV due to optical and FPA imperfections, for example. This corrected data 150 is registered 115. That is, successive frames are transformed to a new position to offset platform motion as detected by an Inertial Measurement Unit (IMU) 130 from the previous frame. These pointing updates 155 equal or exceed the frame rates.

Next, rather than using fixed and global frame summing that may be range-to-object dependent, a unique/local frame sum 165 is assigned to each object to provide a unique track window for each object. This has the benefit of extracting the optimum track information from each object in algorithm implementations operating over the field of regard (FOR) 140. For example, with dim objects, many frames of data may be used and advanced detection algorithms 120 such as Multiple Hypothesis Tracking and Probabilistic Data Association may be employed. As a result, the position update rate for these dim objects will be very low. Continuing, there will likely be a range of dim and bright objects and the optimum number of frame sums for each object can be set. This has the benefit of extracting the most information (higher update rate) about the object while maintaining adequate SNR.

Multiple track windows 125 can operate in parallel on the same set of input data and they may spatially overlap. Sub-frame window control 135 can provide input to registration and frame integration 115. This would occur if two objects of different brightness were within a few pixels of each other. This is referred to as Closely Spaced Objects (CSOs). Correlation techniques between the various windows that overlap are used to determine if CSOs are present. This is valuable information supported in track files 160 for subsequent processing that can be included for systems that have an active band (laser radar for example) to further examine the region.

Another advantage of tracking multiple objects is the reduction of track jitter. The MW/MT Track algorithms can monitor the spectral content of the jitter for multiple tracks and extract common noise features that are IMU and platform based. This information can be used to reduce the track jitter below what would be expected for tracking a single object. Improvements to tracking unresolved dim object include 1) increased effective dynamic range for maximum information extraction, 2) indication of CSOs for examination by a laser radar subsystem, and 3) overall reduction of track jitter.

Figure 2:
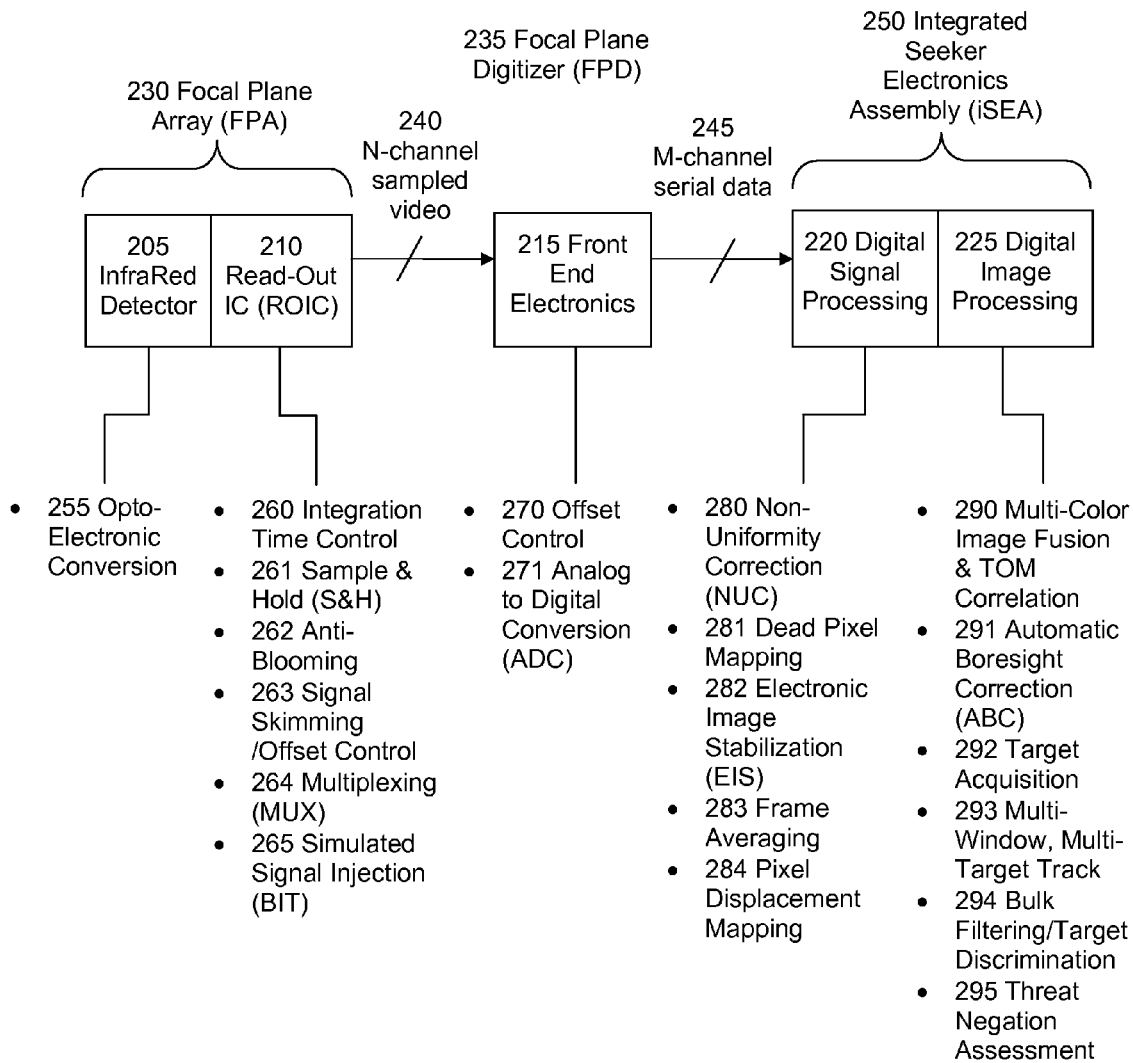
FIG. 2 is a block diagram partially illustrating an Advanced Strap-Down Sensor (ASDS) IR video chain functional schematic configured in accordance with one embodiment of the present invention.

FIG. 2 presents a functional schematic 200 of an embodiment of an ASDS IR video chain, specifically video functions and downstream flow. Focal plane digitizer (FPD) 235 includes FPA 230, front end electronics 215, and integrated seeker electronics assembly (iSEA) 250.

FPA 230 comprises IR detector 205 and read-out integrated circuit (ROIC) 210. IR detector 205 performs opto-electronic conversion 255 of incoming thermal signals. Read-out integrated circuit 210 performs functions of: Integration Time Control 260, Sample & Hold (S&H) 261, Anti-Blooming 262, Signal Skimming/Offset Control 263, Multiplexing (MUX) 264, and Simulated Signal Injection for built in test (BIT) 265. ROIC 210 outputs N-channel sampled video 240, received by front end electronics 215.

Front end electronics 215 perform functions including Offset Control 270, and Analog to Digital Conversion (ADC) 271. Front end electronics 215 then send M-channel serial data 245 to digital signal processing component 220 of iSEA 250.

Digital signal processing 220 performs functions of Non-Uniformity Correction (NUC) 280, Dead Pixel Mapping 281, Electronic Image Stabilization (EIS) 282, Frame Averaging 283, and Pixel Displacement Mapping 284. iSEA 250 also includes Digital Image Processing component 225.

Digital image processing component 225 performs Multi-Color Image Fusion & Target Object Map (TOM) Correlation 290, Automatic Boresight Correction (ABC) 291, Target Acquisition 292, Multi-Window/Multi-Target Tracking 293, Bulk Filtering/Target Discrimination 294, and Threat Negation Assessment 295. TOM Correlation can involve sensor receipt of ground-based object data.

Figure 3:
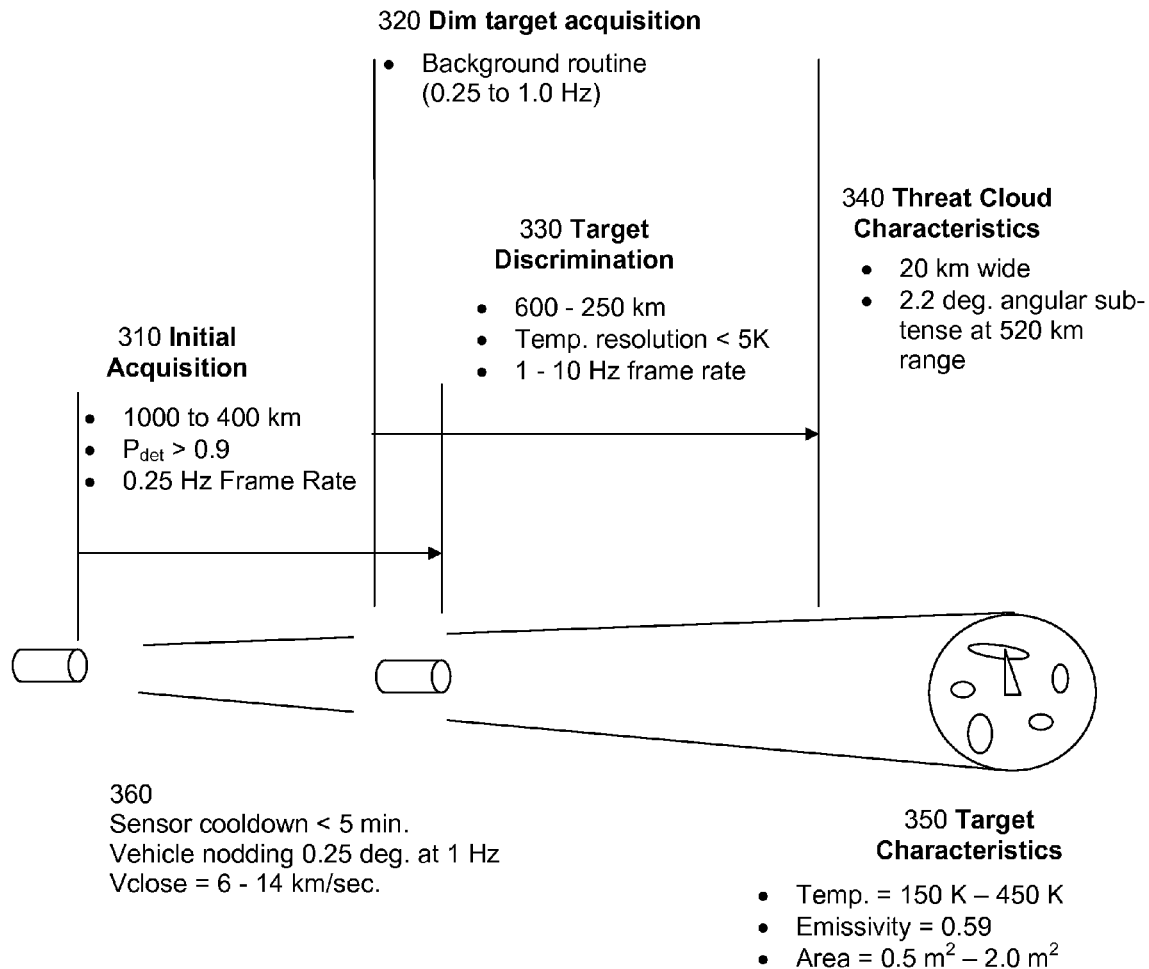
FIG. 3 is a depiction of a passive IR sensor scenario that may employ an embodiment of the present invention.

FIG. 3 is a diagrammatic depiction 300 of an embodiment of a passive IR sensor scenario. It includes a flexible sensor frame for detection and tracking of threats and provides a representative set of scenarios for an ASDS mission. The sensor acquires a group of objects 350 having target characteristics at long range 310 for initial acquisition. Long range initial acquisition can comprise, for example, distances of 1,000 to 400 kilometers, probability of detection ($P_{det}$) greater than 0.9, and frame rates of 0.25 Hz. Target object characteristics can comprise, for example, temperatures of 150 K to 450 K, emissivity of 0.6, and areas of 0.5 $m^2$ to 2.0 $m^2$. Objects 350 may have threat cloud characteristics 340. These threat cloud characteristics can comprise, for example, a 20 kilometer width, and a 2.2 degree angular subtense at a 520 kilometer range.] Object acquisition mode continually runs during the entire mission. At a range of 550 km, the acquired targets are handed off to a track and temperature discrimination process 330 for target discrimination which runs at a higher update rate than the acquisition mode. Target discrimination can comprise distances of 600 to 250 kilometers, temperature resolution of less than 5K, and 1 to 10 Hz frame rates. Dim target acquisition 320 can also occur here as a background routine at 0.25 to 1.0 Hz. Although track and discriminate mode may be less sensitive than acquisition mode, it can give faster track updates. Track and discrimination modes run to about a 200 km range. During this time, threats can be discriminated using two spectral colors. For example, the very long wave infrared (VLWIR) channels provide inputs into the overall ASDS processor which can fuse these results with a laser detection and ranging/laser radar (LADAR) algorithm to track the target objects. Scenario parameters 360 may include sensor cool down time of under five minutes, vehicle nodding of 0.25 deg. at 1 Hz, and a closing velocity of six to fourteen km/sec.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for multi-window/multi-target (MW/MT) tracking for point source objects, comprising the steps of:

detecting at least one object with a focal plane array and outputting a sequence of frames, wherein said sequence of frames are corrected and registered, and successive frames are transformed to a new position to offset platform motion from a previous frame as detected by an inertial measurement unit;

assigning a unique local frame sum to each said object, providing one track window per said object, wherein extent of each said one track window (OTW) comprises a sub-frame with dimensions less than frame from which it is derived;

applying detection algorithms to each said object; and producing track files of at least one of said object.

2. The method of claim 1, wherein said local frame sum is independently controlled for each said object.

3. The method of claim 1, wherein track jitter is reduced by simultaneous tracking of multiple said objects by extracting common noise features that are inertial measurement unit (IMU) and platform based.

4. The method of claim 1, wherein at least one said object comprises an unresolved, sub-pixel, extent.

5. The method of claim 1, wherein target signatures comprise said objects defined by very low signal to noise ratio (SNR).

6. The method of claim 1, wherein said step of detecting objects comprises at least one detection band within visible to very long infrared wavelengths.

7. The method of claim 1, wherein said step of applying detection algorithms comprises Multiple Hypothesis Tracking and Probabilistic Data Association detection algorithms.

8. The method of claim 1, wherein a number of said local frame sums is determined based on brightness of said object.

9. The method of claim 1, wherein multiple said track windows operate in parallel on one set of input data.

10. The method of claim 1, wherein multiple said track windows spatially overlap.

11. The method of claim 10, further comprising correlation techniques between said overlapping track windows wherein a presence of Closely Spaced Objects (CSOs) is determined.

12. A sensor video system to detect and track a plurality of objects comprising:

a focal plane array (FPA) generating N-channel sampled video;

front end electronics receiving said N-channel sampled video, generating M-channel serial data; and an integrated seeker electronics assembly (iSEA) receiving said M-channel serial data, wherein a unique local frame sum is assigned to each said object, providing one track window per detected said object, wherein extent of each said one track window (OTW) comprises a sub-frame with dimensions less than frame from which it is derived;

applying detection algorithms to each said object; and producing track files of at least one of said object.

13. The system of claim 12, further comprising an active band sensor.

14. The system of claim 12, wherein said focal plane array (FPA) comprises at least one infrared detector and at least one read out integrated circuit (ROIC).

15. The system of claim 14 wherein said at least one infrared detector performs opto-electronic conversion.

16. The system of claim 14, wherein said at least one read out integrated circuit (ROIC) comprises integration time control and signal skimming and offset control.

17. The system of claim 12, wherein said front end electronics comprise offset control and analog to digital conversion.

18. The system of claim 12, wherein said integrated seeker electronics assembly (iSEA) comprises digital signal processing and digital image processing.

19. The system of claim 18, wherein said digital signal processing comprises non-uniformity correction and pixel displacement mapping.

20. A multi-window/multi-target (MW/MT) tracking sensor system to detect and track a plurality of objects comprising:

a focal plane array (FPA) generating N-channel sampled video;

front end electronics receiving said N-channel sampled video, generating M-channel serial data;

an integrated seeker electronics assembly (iSEA) receiving said M-channel serial data, wherein a unique local frame sum is assigned to each said object, providing one track window per said object , wherein extent of each said one track window (OTW) comprises a sub-frame with dimensions less than frame from which it is derived ; and an active band sensor providing detection and ranging information fused with said M-channel serial data, producing track files of said objects.

* * * * *